Aug. 24, 1943.   L. W. SCHAAFF   2,327,562
SLIDE FASTENER
Filed Nov. 24, 1941

Inventor
LOUIS W. SCHAAFF
By Blair & Kilcoyne
Attorneys

Patented Aug. 24, 1943

2,327,562

UNITED STATES PATENT OFFICE 2,327,562

SLIDE FASTENER

Louis W. Schaaff, Jackson Heights, N. Y., assignor to Waldes Koh-I-Noor, Inc., Long Island City, N. Y., a corporation of New York Application November 24, 1941, Serial No. 420,284

4 Claims. (Cl. 24—205)

This invention relates to slide fasteners and, with regard to its more specific aspects, to sliders therefor which can be operated both with and against the chain.

Sliders as hitherto constructed have adhered to the recognized concept of slider operation requiring that the slider be operated "with the chain," i. e., in the direction in which the locking projections of the fastener elements point, to effect engagement of the elements, and in the opposite direction to effect disengagement of the elements. That this is so is borne out by the fact that it is difficult, if not impossible, to make a conventionally formed slider operate "against the chain" under a condition requiring that the fastener elements be reversed relative to the slider or equivalently that the slider be reversed relative to the fastener elements. This difficulty in operation under the conditions of reversal aforesaid is due to the fact that the fastener elements turn on a gentle arc of relatively great radius as they move into and out of the branches of the slider race which extend to the side of the divider or wedge. Whereas normally disposed fastener elements may comfortably clear the working or spreading end of the divider, due to the curvature of the locking projections or the sloping of the ends of the elements adjacent the divider, the right-angled under corners of reversed fastener elements, when the elements turn on an arc of large radius as aforesaid, cannot slide past the working end of the divider with the required clearance but, on the other hand, snub against the end of the divider or against its sides, with the result that free passage of the elements into and out of the branch portions of the slider race is retarded if not prevented.

The present invention contemplates and provides a slide fastener employing a slider which is so constructed that it may be operated either "with" or "against" the chain, thus to satisfy a condition arising in specialized slider fastener applications which requires that the slider be operated not only with the chain as is conventional, i. e., in the direction opposite to that in which the locking projections point to effect disengagement of the fastener elements, and in the reverse direction to effect meshing or engagement of the elements, but also against the chain, i. e., in the direction in which the fastener element locking projections point to effect disengagement of the elements, and in the reverse direction to effect engagement of the elements. More specifically, the invention provides a two-way slider that can be operated on one and the same chain of fastener elements in both directions whereby, under conditions requiring the same, the slider may be employed to effect either engagement or disengagement of the fastener elements when operated either with or against the chain and regardless of the direction in which the locking projections point.

It is a further object of the invention to provide a slider of increased adaptability as compared with the conventional one-way slider in that the present invention offers a slider which may be operated satisfactorily and in desired manner when the fastener chain is reversed relative to the slider or under the equivalent condition in which the slider is reversed relative to the chain.

The invention also contemplates the provision of simple and readily applied means for converting a slider which is constructed and designed for one-way operation to one capable of two-way operation, that is, for operation both with and against the chain of fastener elements.

Other objects will be in part obvious and in part hereinafter pointed out in connection with the following analysis of this invention wherein is illustrated an embodiment of the invention in detail.

Referring to the drawing, Fig. 1 is a diagrammatic view illustrating in graphic manner the difference in spreading angle between the divider of a slider conventionally formed and the divider of the present two-way slider;

Figure 1:
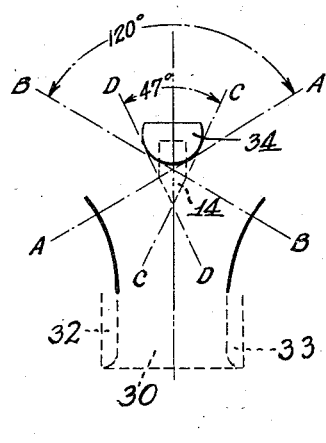

In the drawing, wherein like reference characters designate like parts throughout the several views, Fig. 1 illustrates diagrammatically the obtuse spreading angle for the fastener elements provided by a two-way slider according to the invention, as distinguished from the acute spreading angle characterizing conventional sliders which are capable of one-way operation only, that is to say, the prior sliders can be moved freely only in the direction in which the locking projections, with which the fastener elements are provided, point to engage the fastener elements and in the opposite direction to disengage said elements. In such figure reference character 14 represents a prior type of divider or wedge (shown in dotted lines) which is elongated and of narrow width and whose working end is sharply pointed to function somewhat as a knife edge. The divider 14 provides an acute spreading angle subtended by the lines C—C and D—D which, as shown, form a continuation of the divider side faces at the pointed end thereof, the spreading angle being in the neighborhood of 47°. Due to the acuteness of this spreading angle, it will be observed that the race branch portions to the sides of the divider diverge from each other by approximately the same angle as that contained between the inclined side faces of the divider.

As distinguished therefrom, the divider 34 of the two-way slider of the present invention is laterally extended to provide a spreading angle which is obtuse rather than acute, being in excess of 90°, and preferably in the neighborhood of 120°, as measured between tangents A—A and B—B to its periphery at points corresponding to the points at which the working ends of the fastener elements contact the divider as the latter spreads the elements. Thus, upon movement of the slider 10 in fastener opening direction, the fastener elements in moving into the diverging branch portions of the race, of which the laterally extended divider forms the inner sides, are spread at a much greater angle than can be provided by the pointed-end type of divider 14.

Figure 2:
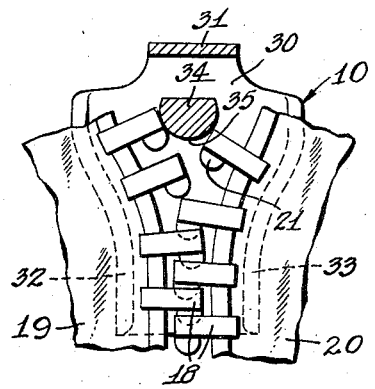
Fig. 2 is a view taken through a slide fastener employing the two-way slider of the present invention, in which the slider is reversed relatively to its normal position for operation against the chain of fastener elements.

The application of a divider providing an obtuse spreading angle to a slider adapted to be operated against a chain of fastener elements will be apparent from Fig. 2 wherein a slider according to the invention, having a laterally extended divider 34 whose working end 35 is bellied or bluntly rounded, is positioned on the chain of fastener elements 18 carried by a pair of stringers or tapes 19, 20 in such manner that the locking projections 21 of the elements point in the direction of the straightway portion of the race and away from the diverging branch portions thereof. It will be here observed that this position of the slider relative to the fastener elements is the reverse of its conventional position and results in the under corners of the fastener elements, which are substantially right-angled, being presented to the divider as the slider is moved downwardly in fastener opening direction.

As is understood, the race for the fastener elements is defined along its outer sides by marginal flanges 32, 33 which depend inwardly from the slider plates or wings, of which the slider rear plate 30 is shown, the plates being shown as connected by an integral bridge or neck 31. Due to the lateral extension of the divider 34 the race branches to the sides of the divider diverge from one another by an angle which corresponds generally to the obtuse spreading angle as provided by the divider 34, with the divider forming the inner sides of the diverging race branches.

The aforesaid arrangement is such that a slider positioned as in Fig. 2 can operate against the chain by reason of the fact that the fastener elements are caused and permitted to turn throughout a substantial spreading angle as they diverge and thereupon pass into the race branches in the opening movement of the slider, the shape and disposition of the divider being such that it offers no interference to the free and easy movement to the right-angled under corner of the fastener elements past the same. As the slider is moved in closing direction, the reverse operation takes place, the spreading elements moving past the divider and being disposed by the slider side flanges in such manner that they interlock in moving into and through the straightway portion of the race. It will be understood that in addition to its capability of operating against the chain, a slider according to the invention possesses the inherent capability also of operating with the chain. Accordingly, there is achieved the objective of the present invention of providing a slider which is capable of operation both with and against the chain for such slider applications where two-way operation is of advantage.

Figure 3:
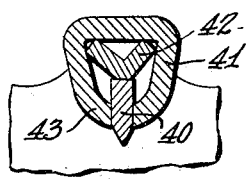
Fig. 3 is a partial section through a modified form of slider capable of two-way operation.
Figure 4:
Fig. 4 is a detail of the collar element employed to effect conversion of a conventionally formed slider from one-way to two-way operation.

Under some conditions it may be desirable to convert an already finished slider designed for one-way operation to a slider capable of two-way operation. To this end the arrangement indicated in Fig. 3 has been provided. According to this arrangement the slider is provided with a conventional knife-edge divider 40 extending between slider plates. To effect lateral extension of and thereby provide for a greater spreading angle than can be provided by the divider 40, an element 41 in the nature of a split circular collar as indicated in Fig. 4 is spread and thereupon wrapped around, so to speak, both the integral bridge 42 extending between slider plates and the divider 40. By suitably shaping the split collar 41 to its desired curvature and by bringing the ends of the collar against the side faces of the divider 40 adjacent the pointed end thereof, there results a divider having a bellied working end 43 which corresponds to the bluntly rounded working end 35 of the divider 34 shown in Fig. 2.

While the pointed end of the divider 40 is shown to extend relatively below the bellied working end 43 of the shaped collar, such is immaterial as either the curved or sloped faces of the locking projections of a chain normally disposed, or the under corners of fastener elements which are reversely disposed as in Fig. 2, will, due to the wide spreading angle provided by the divider 41, engage the latter at contact points definitely to the side of the pointed end of the divider 40. Hence, the extending point offers no substantial interference to the free movement of the fastener elements into and out of the race branches of the slider.

By the foregoing slider construction, a slider capable of two-way operation is provided, that is to say, it can be operated on one and the same chain regardless of the direction in which the locking projections thereof face or point. This two-way operation is of special utility in slide fastener installations requiring for one reason or another the reversal of chains relative to the slider or the equivalent condition of reversal of slider relative to chain. While the various applications to which the slider of the present invention may be put will be reserved for future applications, one adaptation of a two-way slider is disclosed in my copending application Serial No. 418,083, filed November 6, 1941, entitled "Closure for slot-like apertures."

As many changes could be made in carrying out the above constructions without departing from the scope of the invention, it is intended that all matter contained in the above description or shown in the accompanying drawing shall be interpreted as illustrative and not in a limiting sense.

I claim:

1. A slide fastener comprising a chain formed by a pair of stringers having rows of fastener elements attached to the adjacent edges thereof, the fastener elements being provided with similarly pointed locking projections extending from a surface of their working ends, the under corners of said ends being substantially right-angled, and a slider adapted for operation both "with" and "against" the chain comprising a slider body providing a race for the fastener elements having straightway and diverging branch portions, and including a divider provided with a bluntly rounded working end forming an obtuse spreading angle for the fastener elements.

2. A slide fastener comprising a chain formed by a pair of stringers having rows of fastener elements attached to the adjacent edges thereof, the fastener elements being provided with similarly pointed locking projections extending from a surface of their working ends, the under corners of said ends being substantially right-angled, and a slider adapted for operation both "with" and "against" the chain comprising a slider body providing a race for the fastener elements including straightway and diverging branch portions, and having a divider whose working end is bluntly rounded to provide a spreading angle of at least 100°.

3. A slider adapted for operation both "with" and "against" a chain of fastener elements having similarly pointed locking projections which extend from a surface of their working ends, the under corners of which are substantially right-angled, comprising spaced plates having depending marginal side flanges and a divider extending between said plates and forming therewith and the side flanges thereof a straightway race portion for engaged fastener elements and race branches for the disengaged fastener elements which diverge from each other by an angle of at least 100°, the divider being laterally extended to provide the inner sides of the diverging race branches.

4. A slide fastener comprising, in combination, a chain of adjacent rows of fastener elements having similarly pointed locking projections which extend from a surface of their working ends, the under corners of which are substantially right-angled, and a slider for engaging and disengaging said elements comprising spaced plates having depending marginal side flanges and a divider extending between said plates and forming therewith and the side flanges thereof a straightway race portion for the engaged fastener elements and race branches for the disengaged fastener elements which diverge from each other by an angle of at least 100°, the divider being laterally extended to provide the inner sides of the diverging race branches, the slider being positioned on the chain of fastener elements in such manner that the locking projections of the elements point into the straightway race portion and away from the diverging race branches.

LOUIS W. SCHAAFF.